United States Patent [19]

Miller

[11] Patent Number: 5,816,546
[45] Date of Patent: Oct. 6, 1998

[54] CLAMP FOR A VEHICLE GUN RACK

[75] Inventor: Jerry N. Miller, Carmel, Ind.

[73] Assignee: Pro-Gard Industries, L.P., Indianapolis, Ind.

[21] Appl. No.: 627,770

[22] Filed: Apr. 1, 1996

[51] Int. Cl.⁶ .................................................. A47B 96/06
[52] U.S. Cl. ......................................... 248/205.1; 211/64
[58] Field of Search ................................ 248/689, 200.1, 248/208, 215, 220.21, 229.12, 312.1, 352, 229.2, 229.26, 231.81, 274.1, 298.1, 316.8, 316.1, 228.2; 211/64

[56] References Cited

U.S. PATENT DOCUMENTS

| | | |
|---|---|---|
| D. 356,541 | 3/1995 | Morford . |
| 2,929,539 | 3/1960 | Safreno . |
| 3,261,521 | 7/1966 | Meccico et al. ........................ 211/64 |
| 3,326,385 | 6/1967 | Pinkerton et al. . |
| 3,473,673 | 10/1969 | Porter ...................................... 248/201 |
| 3,802,612 | 4/1974 | Smith . |
| 4,120,436 | 10/1978 | Burch . |
| 4,648,516 | 3/1987 | Elkins . |
| 4,747,280 | 5/1988 | Shaw . |
| 5,078,279 | 1/1992 | Hancock . |
| 5,078,309 | 1/1992 | Hull et al. . |
| 5,116,010 | 5/1992 | McMasters et al. . |
| 5,350,094 | 9/1994 | Morford . |

OTHER PUBLICATIONS

Gant's Law Enforcement Equipment Company, 1989 catalog, pp. 19, 143, 145, 147.
Overhead Gun Rack—Air Bag Friendly, Pro–Gard Industries advertising literature, Model No. 3C–5000, Jun. 17, 1994.
Overhead Partition Gun Rack, Pro–Gard Industries advertising literature, Model No. 3C–5002, Jun. 17, 1994.
Overhead Wire Screen Gun Rack, Pro–Gard Industries advertising literature, Model No. 3C–5003, Jun. 17, 1994.
Overhead Gun Rack, Pro–Gard Industries advertising literature, Model No. 3C–5000W, Sep. 20, 1994.
Pro–Gard Gun Mounts, Pro–Gard Industries advertising literature, p. 2, publication date unknown.
Gun Locks, Pro–Gard Industries, 1994 catalog, pp. 7–8.
Pro–Gard Products Meyer Plastics, Inc., Pro–Gard Gun Rack Installation Instructions, Jan., 1986.
Big Sky Racks Inc., Pricing—Terms, Jan. 1, 1990.
Big Sky Racks Inc., Pricing—Terms, Jan. 1, 1991.
Big Sky Racks Inc., The BSR Model Series, advertising literature, publication date unknown.
Big Sky Racks Inc., Best Gun Rack You'll Find Anywhere!, advertising literature, publication date unknown.
Big Sky Racks Inc., Mounting Instructions, Models BSR–1, BSR–1L, BSR–2, BSR–2W, Five Year Limited Warranty, publication date unknown.
Best Gun Rack You'll Find Anywhere, advertising literature, publication date unknown.
Big Sky Racks, Inc., ELS–100 Weapon Mounts, Law Enforcement Product News, Nov.–Dec. 1984 issue.
Big Sky Racks, Inc., Law Enforcement Weapon Mounts, advertising literature, publication date unknown.
Pistenti, David W., Vehicular Long–Barrel Weapons Mount, FBI Law Enforcement Bulletin, May 1991.
Pro–Tech Design & Mfg., Inc., Memorandum Subject: Weapons Racks for Vehicles, publication date unknown.
Pro–Tech Design & Manufacturing, Inc., Model 629 Top Gun Vehicle Weapon Mounting System, advertising literature, publication date unknown.

*Primary Examiner*—Ramon O. Ramirez
*Assistant Examiner*—Willie Berry, Jr.
*Attorney, Agent, or Firm*—Barnes & Thornburg

[57] ABSTRACT

A clamp for fixing a gun rack to a vehicle includes an elongated frame, a first clamp member for gripping a door frame attached to the frame, a second clamp member for gripping a door frame spaced apart from the first clamp member and movable relative to the frame, and a tightened attached to the frame and to the second clamp member to move the second clamp member relative to the first clamp member to position the clamp members so they grasp a first door frame and a second door frame of the vehicle.

20 Claims, 3 Drawing Sheets

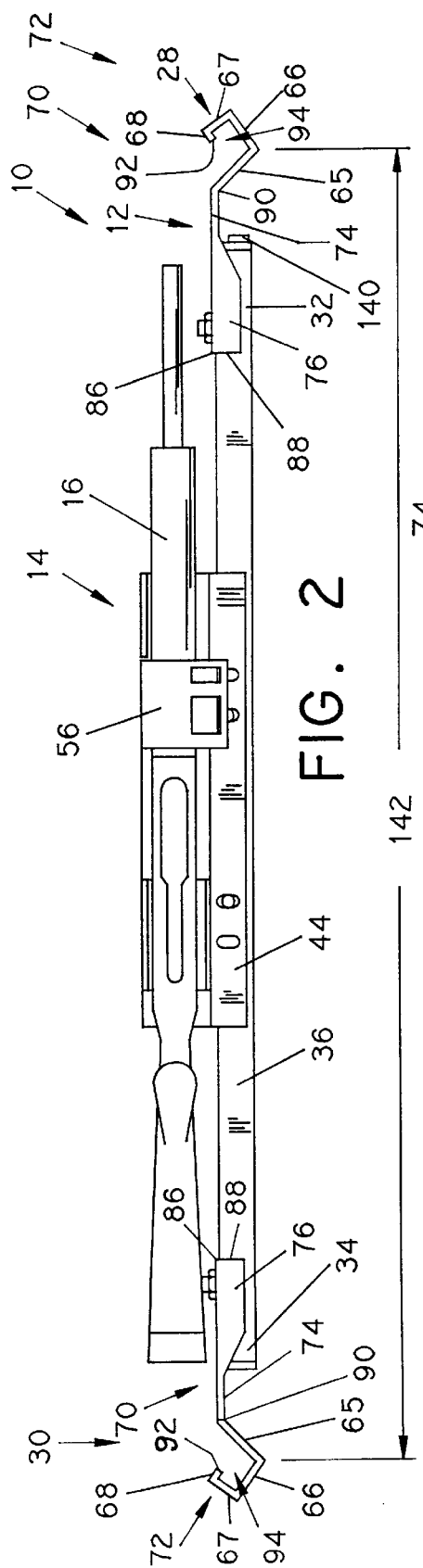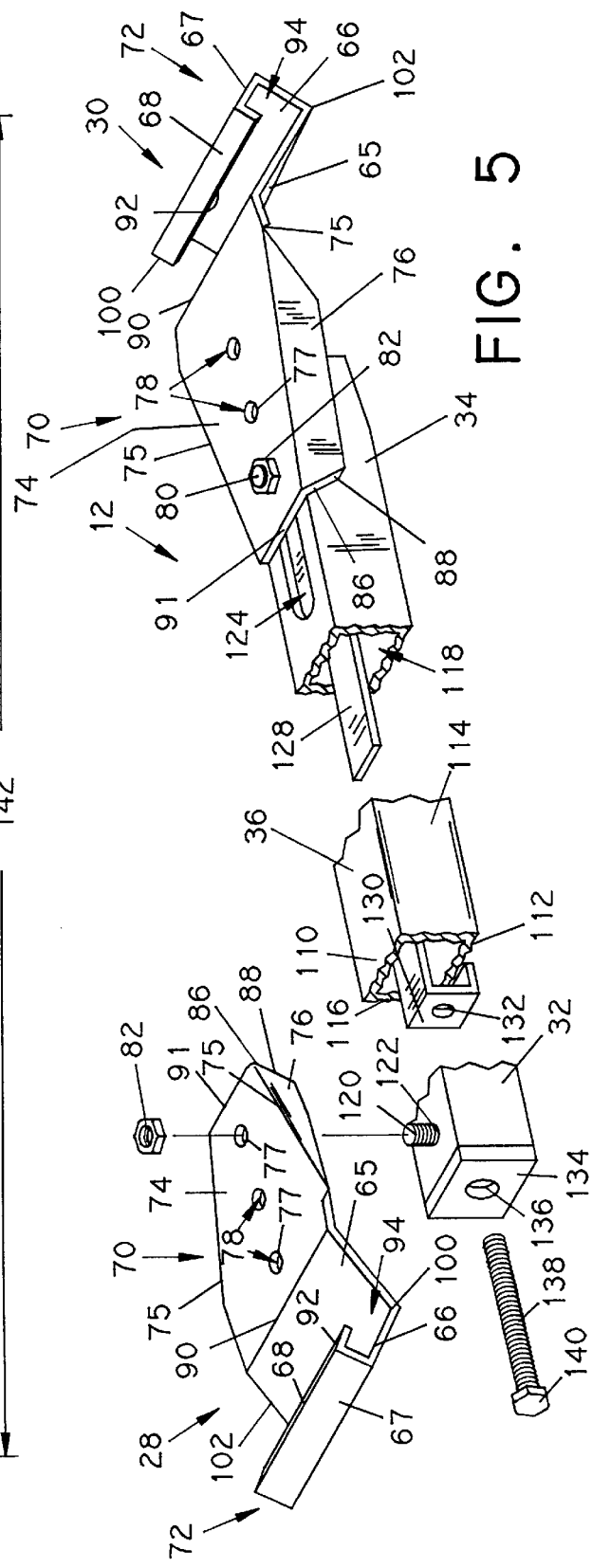

CLAMP FOR A VEHICLE GUN RACK

BACKGROUND SUMMARY OF THE INVENTION

The present invention relates to vehicle gun racks, and particularly to a clamp for a vehicle gun rack for supporting the vehicle gun rack adjacent to the roof of a vehicle. More particularly, the present invention relates to a clamp for a vehicle gun rack that can be clamped to sides of the vehicle frame adjacent to the rear doors of the vehicle without the need to drill holes in the vehicle or in any other manner penetrate the vehicle for installation of the clamp and of the vehicle gun rack in the passenger compartment of the vehicle.

Gun racks that are mountable to vehicles for supporting guns inside of the passenger compartments of vehicles are known in the art. For example, U.S. Pat. Nos. 5,078,309 to Hull et al.; 4,648,516 to Elkins; and 3,326,385 to Pinkerton et al. all disclose gun racks that are mounted in a generally vertical position against a window, screen, or wall of a vehicle. In addition, it is known to provide vehicle gun racks for supporting a gun in an upstanding position with the butt of the gun extending upwardly from the floor as shown, for example, for the model number 3C-3500 floor mount gun rack disclosed in advertising literature entitled PRO-GARD GUN MOUNTS, published in 1988 by the assignee of the present invention, or in an upstanding position with the barrel of the gun extending upwardly as disclosed, for example, in U.S. Pat. No. 4,747,280 to Shaw.

It is also known to provide a gun rack for supporting a gun adjacent to the ceiling of the passenger compartment of the vehicle, particularly for the purposes of concealing the gun and providing access to the gun carried by the gun rack to a person in the front seat of the vehicle. For example, U.S. Pat. Nos. 5,350,094 to Morford; 4,120,436 to Burch; and 3,802,612 to Smith all disclose vehicle gun racks for supporting a gun adjacent to the ceiling of the passenger compartment of a vehicle.

What is needed is a support for a weapon holder carrying a weapon which can easily be mounted adjacent to the ceiling of the passenger compartment of a vehicle so that the weapon is concealed from people outside of the vehicle. The gun rack should provide a law enforcement officer or other person in the driver's seat of the vehicle with clear access to the weapon. In addition, the clamp should be adjustable relative to the front and rear of the vehicle so that the gun rack is movable to accommodate the reach of law enforcement officers having varying heights and reaches and the position of the clamp and holder should be easily adjustable so that the adjustment relative to the front and rear of the vehicle can be quickly and easily completed. Finally, the installation of the clamp should be completed without any portion of the clamp or any fastener attached to the clamp penetrating the structure of the vehicle or in any other way damaging or diminishing the integrity of the structure of the vehicle.

According to the present invention, a clamp is provided for fixing a weapon holder to a vehicle. The clamp includes an elongated frame and a first clamp member attached to the frame. A second clamp member engages the frame and is spaced apart from the first clamp member. A tightener is movably coupled to the frame and is fixed to the second clamp member so that the second clamp member moves relative to the first clamp member to mount the clamp to the vehicle.

In preferred embodiments, the gun rack in accordance with the present invention includes a clamp that is mountable to a vehicle and a weapon holder fixed to the clamp for carrying the weapon. A frame member of the clamp carries the weapon holder and the weapon within the passenger compartment of the vehicle. The weapon holder preferably includes a bracket attached to the frame member and arms extending outwardly from the bracket for supporting the weapon. If desired, the weapon holder can also include a gun lock for locking the firearm to the holder. The gun lock can be provided with a solenoid for electronically releasing the locking mechanism, for example, after pressing a button, and a timer for causing the solenoid to release the locking mechanism and hold the locking mechanism in the released condition for a predetermined time delay so that the law enforcement officer has time to remove the weapon before the time delay expires and the gun lock relocks.

The frame member is clamped to the vehicle by a first clamp member carried on a first end of the frame member and a second clamp member carried on a second end of the frame member. The frame member includes a first threaded post fixed to the first end of the frame member and extending upwardly therefrom and a second threaded post engaging the second end of the frame member and extending upwardly therefrom. Each clamp member is formed to include a plurality of longitudinally spaced-apart openings. The first threaded post is received by one of the openings of the first clamp member and the second threaded post is received by one of the openings of the second clamp member. The length of the vehicle clamp can be adjusted to fit the vehicle in which the vehicle clamp is being mounted by selecting the appropriate opening of the longitudinally spaced-apart openings formed in each clamp member that will position the clamp members relative to one another to fit the vehicle and allow the clamp members to engage and tightly clamp the vehicle.

Each clamp member includes a vehicle-engaging portion and an attachment portion attaching the clamp member to the frame member. The attachment portion includes a generally horizontal plate formed to include the longitudinally spaced-apart openings and a spaced-apart pair of generally vertically-extending flanges appended to the plate and extending downwardly therefrom. The flanges are spaced-apart so that when the clamp member is installed on the frame member and the post is received in one of the longitudinally spaced-apart openings, the flanges engage opposing sides of the frame member to prevent rotation of the clamp member about an axis defined by the threaded post.

The vehicle-engaging portion of each clamp member is integrally appended to the plate so that the vehicle-engaging portion is fixed relative to the attachment portion and the vehicle-engaging portion is longitudinally spaced-apart from the openings formed in the plate. The vehicle-engaging portion is configured to curl around a rim of the door frame of the vehicle so that a tip of the vehicle-engaging portion of each clamp member engages the door frame of the vehicle. When the first and second clamp members are mounted to the frame member and the clamp is mounted to the vehicle, the tips of the vehicle-engaging portions of the first and second clamp members are in an opposing relation engaging the door frames so that the clamp and the weapon holder are snugly clamped to the vehicle.

Thus, the gun rack having a clamp in accordance with the present invention can be mounted to the vehicle without drilling holes in the vehicle structure or the head liner of the passenger compartment to receive bolts, rivets, or any other type of attachment mechanism. In addition, vehicle-engaging portions of the clamp members can be configured so that an inner gasket typically found encircling an inner portion of the rim of the vehicle door frame can be fit within a gasket-receiving space defined, by the vehicle-engaging portion so that the inner gasket is not cut or otherwise damaged by the vehicle-engaging portion of the clamp member.

The frame member is preferably a hollow member defining an interior region. A tightener is received within the interior region and is formed to include a first end coupled to the frame and a second end fixed to the second clamp member. Preferably, the tightener is coupled to the frame by a tightening bolt extending longitudinally through a stop plate positioned to lie on an end of the frame member and into the interior region to be threadably received by a flange appended to the tightener. Rotating the tightening bolt causes the tightener to move the second clamp member in a longitudinal direction relative to the frame member. Thus, turning the tightening bolt positions the second clamp member that is fixed to the tightener relative to the first clamp member that is fixed to the frame member.

When installing the gun rack into a vehicle, a user will open the vehicle rear doors to expose the door frames surrounding the rear doorways. Each of the first and second clamp members are placed on their respective threaded posts of the frame member so that each threaded post is received by one of the longitudinally spaced-apart openings formed in the plate of each clamp member. The distance between the clamp members is adjusted by selecting the appropriate opening on the attachment portion of each clamp member to receive the threaded post and the distance between the clamp members is selected to generally match the distance between the opposing rims of the rear door frames.

Once the first and second clamp members are installed on the frame member, the gun rack is lifted so that the clamp members engage the rear doorways of the vehicle. The rims of the frames surrounding the doorways are received in the spaces defined by the curled vehicles-engaging portions of each respective clamp member when the clamp members engage the doorways and the tips of the clamp members engage the rims. The gun rack is moved along the rims of the door frames until the holder is located in the desired position relative to the front and rear of the vehicle to accommodate the reach of the law enforcement officer that will be using the vehicle. Once the location of the gun rack is established, the tensioning bolt is turned to pull the second clamp member toward the first clamp member in order to tighten and mount the clamp against the door frames of the rear doors of the vehicle so that the weapon holder is mounted adjacent to the ceiling of the passenger compartment.

Additional objects, features and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 2 is a front elevation view of the vehicle gun rack of FIG. 1 showing a weapon held by the weapon holder and supported above the gun rack and first and second clamp members attached to first and second ends of the clamp by threaded posts, each clamp member including downwardly-extending flanges appended to the horizontal plate, the flanges engaging both sides of the frame member to prevent rotation of the clamp members about the threaded posts;

FIG. 5 is an exploded perspective view of the clamp with portions broken away showing the first and second clamp members mounted to first and second ends of the frame member, each clamp member including an attachment portion having a generally horizontal plate which is formed to include a plurality of longitudinally spaced-apart openings, one opening of each clamp member receiving a threaded post, the threaded post on the first end being fixed relative to the frame member and the threaded post on the second end being fixed to the tightener that is received in the interior region of the frame member, the tightener including a flange defining a threaded opening receiving a longitudinally-extending tightening bolt that extends into the interior region of the frame member so that rotation of the tightening bolt will cause the second clamp member to move toward the first clamp member to tightly clamp the frame to the rims of the rear door frames of the vehicle.

DETAILED DESCRIPTION OF THE DRAWINGS

Figure 1:
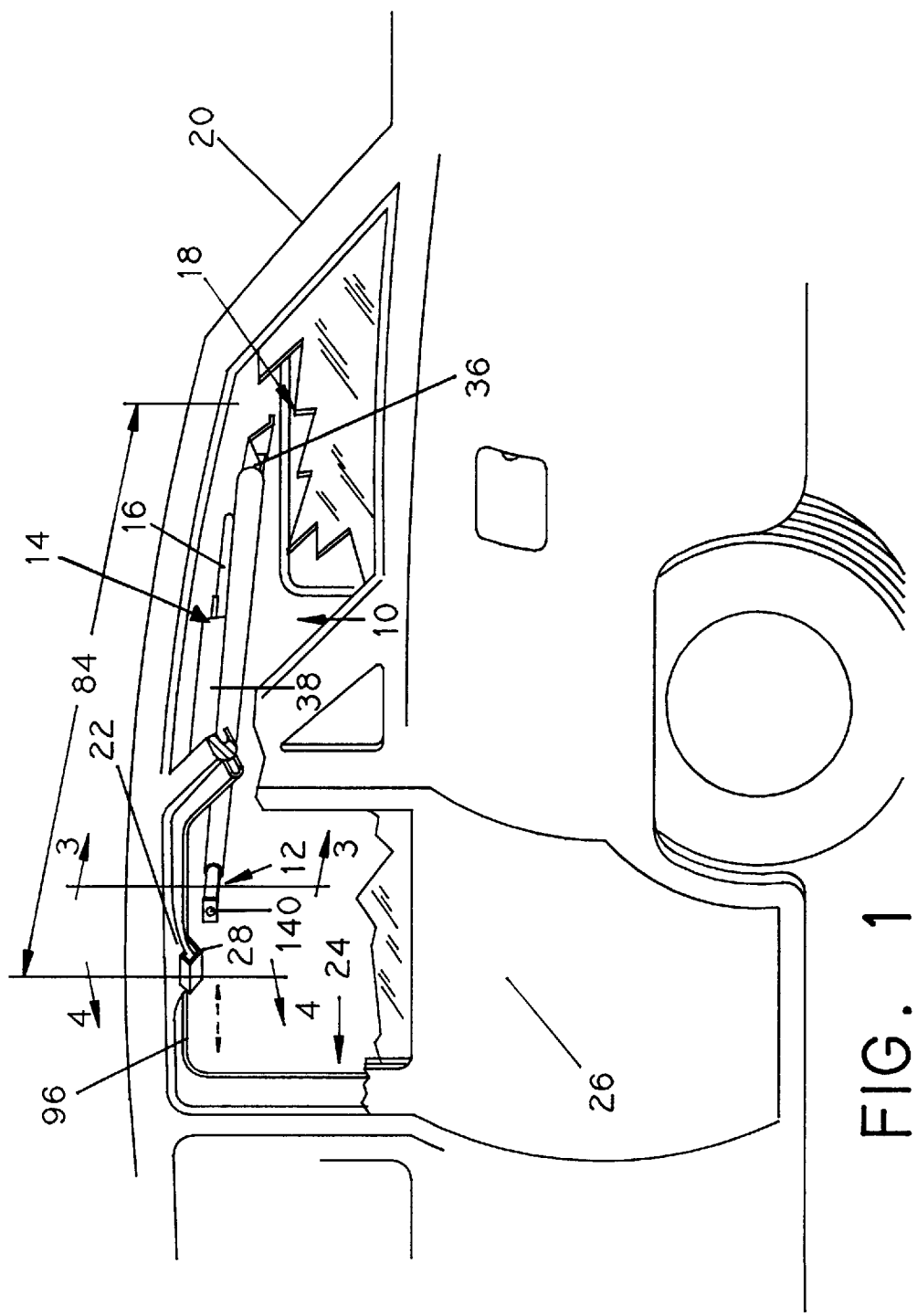
FIG. 1 is a perspective view with portions broken away showing a vehicle gun rack in accordance with the present invention including a weapon holder fixed to a clamp that is mounted in the passenger compartment of a vehicle, the clamp including an elongated frame member carrying clamp members that are clamped to the door frames of the rear doors of the vehicle and that can be clamped at any position along the door frames to suit the reach of a law enforcement officer or other person in the driver's seat the vehicle, the clamp members engaging the door frames of the vehicle without penetrating or damaging the head liner of the vehicle or other portions of the vehicle's structure, without damaging an inner gasket of each door frame, and without requiring the use of fasteners that penetrate the vehicle structure or damage the inner gasket of each door frame.

A vehicle gun rack 10 including a clamp 12 in accordance with the present invention and a weapon holder 14 attached to clamp 12 and carrying a weapon 16 is mounted in a passenger compartment 18 of a vehicle 20 as shown, for example, in FIG. 1. Illustrative clamp 12 is clamped to opposing rims 22 of door frames 24 of rear doors 26 of vehicle 20. Clamp 12 can be adjusted toward the front or the rear of vehicle 20 simply by releasing clamp 12, adjusting the position of clamp 12 to accommodate the reach of a law enforcement officer or other person in the front seat of the vehicle (hereinafter the law enforcement officer), and reclamping clamp 12 to rims 22.

Vehicle gun rack 10 carries weapon 16 in weapon holder 14 as shown in FIG. 2. Weapon holder 14 is attached to clamp 12 of vehicle gun rack 10 so that weapon 16 is positioned to lie above clamp 12 when vehicle gun rack 10 is mounted to vehicle 20 as shown in FIG. 1 to generally conceal weapon 16 from people outside of vehicle 20. In addition, the law enforcement officer in the front seat of vehicle 20 can easily access weapon 16 carried by weapon holder 14 when clamp 12 is adjusted relative to the front and rear of vehicle 20 to suit the reach of the law enforcement officer so that weapon 16 is easily within the reach of the law enforcement officer.

Clamp 12 includes a first clamp member 28 and a second clamp member 30 that are carried on a first end 32 and a second end 34 of a frame member 36, respectively, as shown in FIG. 1. First clamp member 28 cooperates with second clamp member 30 to clamp vehicle gun rack 10 to vehicle 20. If desired, frame member 36 can be covered by padding 38, for example, a sheet of foam rubber can be wrapped around frame member 36.

Figure 3:
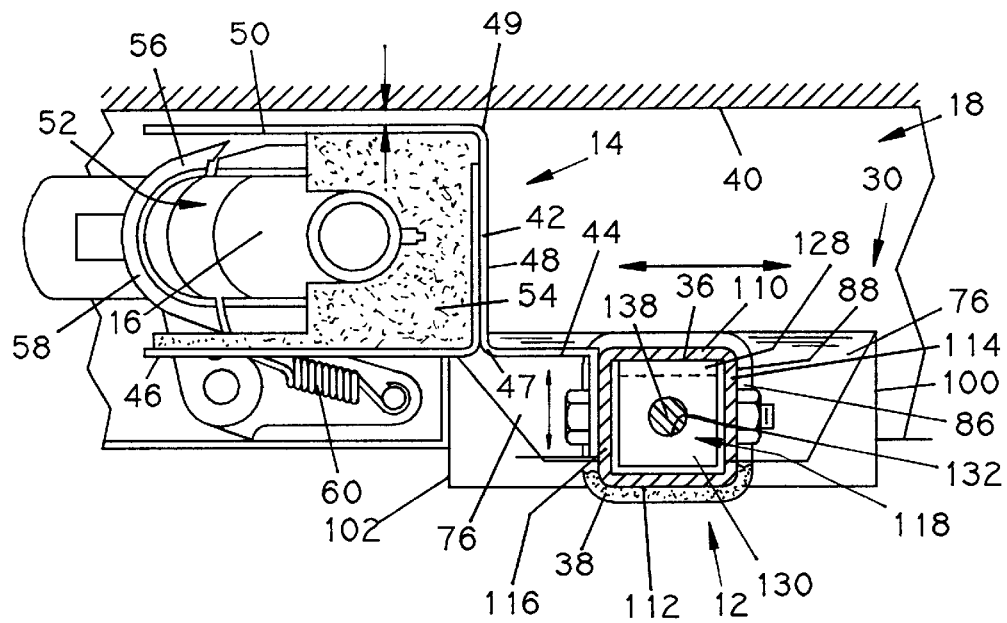
FIG. 3 is a sectional view taken along line 3—3 of FIG. 1 showing a round barrel of a weapon carried by the weapon holder that is bolted to the square frame member of the gun rack and a flange of a tightener received in an interior region of the frame member, the flange defining an opening receiving a threaded tightening bolt that can be turned to position the second clamp member relative to the first clamp member in order to clamp and release the clamp from the door frames.

Weapon holder 14 is positioned to lie adjacent to a ceiling 40 of passenger compartment 18 as shown in FIG. 3 when clamp 12 is clamped to rims 22 of door frames 24. Weapon holder 14 includes a bracket 42 carrying weapon 16, bracket 42 being connected to frame member 36 by a bent coupling plate 44. In preferred embodiments, coupling plate 44 is integrally appended to bracket 42 and is bolted to frame member 36, although any suitable mechanism for fixing bracket 42 to frame member 36 can be used without exceeding the scope of the invention as presently perceived.

Bracket 42 includes a generally vertically-extending holder plate 48 having a proximal end 47 appended to coupling plate 44 and extending upwardly to a distal end 49 appended to a generally horizontal support plate 50 as shown in FIG. 3. Generally horizontally-extending arms 46 are attached to holder plate 48 and are spaced apart from support plate 50 to define a gun-receiving space 52 therebetween for receiving weapon 16. If desired, arms 46, holder plate 48, and support plate 50 can be covered by foam rubber 54 to provide additional support and cushioning for weapon 16 against weapon holder 14.

In preferred embodiments, a gun lock 56 is attached to holder plate 48 of weapon holder 14. Gun lock 56 includes a pivotable lock arm 58 moveable when lock arm 58 is unlocked between an upward lock position shown in FIG. 3 and a downward release position allowing weapon 16 to be removed from weapon holder 14. Lock arm 58 is biased toward holder plate 48 by a spring 60 to yieldably hold lock arm 58 in the lock position when lock arm 58 is unlocked.

If desired, gun lock 56 can be provided with a solenoid (not shown) for electronically locking and unlocking lock arm 58 of gun lock 56, a timer (not shown) electronically coupled to the solenoid, and a button (not shown) that can be remotely located away from gun lock 56 for activating the solenoid and the timer. For example, the button can be mounted on a dashboard (not shown) of vehicle 20 and coupled to the timer and the solenoid so that when the button is pressed, the timer starts to run and the solenoid releases lock arm 58 from gun lock 56 so that lock arm 58 can be moved to the release position. Once a predetermined amount of time has elapsed as measured by the timer, the solenoid can automatically relock lock arm 58 to gun lock 56 so that lock arm 58 is locked in the lock position securing weapon 16 to weapon holder 14. Thus, gun lock 56 can be unlocked for the predetermined amount of time after the law enforcement officer presses the button on the dashboard to provide the predetermined amount of time for the officer to retrieve weapon 16 from weapon holder 14 before relocking lock arm 58 to gun lock 56.

Although the weapon holder of vehicle gun rack 10 is preferably weapon holder 14 described herein with reference to FIGS. 2 and 3, vehicle gun rack 10 can include any weapon holder that can be fixed to frame member 36 and that can fit within passenger compartment 18 of vehicle 20 when clamp 12 is clamped to rims 22 of door frames 24 of vehicle 20. Thus, it is within the scope of the invention as presently perceived to provide vehicle gun rack 10 including clamp 12 as described herein and any weapon holder fixed to clamp 12 that can carry a weapon and that will fit within passenger compartment 18 when clamp 12 is clamped to vehicle 20.

Weapon holder 14 is fixed to clamp 12 and clamp 12 is clamped to rims 22 of door frames 24 of vehicle 20 to mount clamp 12 and weapon holder 14 of vehicle gun rack 10 to vehicle 20 as shown in FIG. 1. Clamp 12 includes frame member 36 that is preferably formed from square steel stock having an elongated top 110, an elongated bottom 112 spaced apart from top 110, and spaced-apart elongated first and second sides 114, 116 integrally appended to top 110 and bottom 112 as shown in FIGS. 3 and 5. Top 110, bottom 112, first side 114, and second side 116 cooperate to define an interior region 118 of frame member 36.

Although frame member 36 is preferably made from square steel stock, the cross-sectional shape of frame member 36 can be varied without exceeding the scope of the invention as presently perceived so long as first and second clamp members 28, 30 can operate as described below. In addition, frame member 36 can be made from materials other than steel, including other metals, plastics materials, and wood without exceeding the scope of the invention as presently perceived so long as frame member 36 has sufficient strength to support weapon holder 14 during use of vehicle gun rack 10 in a law enforcement vehicle 20 or other vehicle 20.

Figure 4:
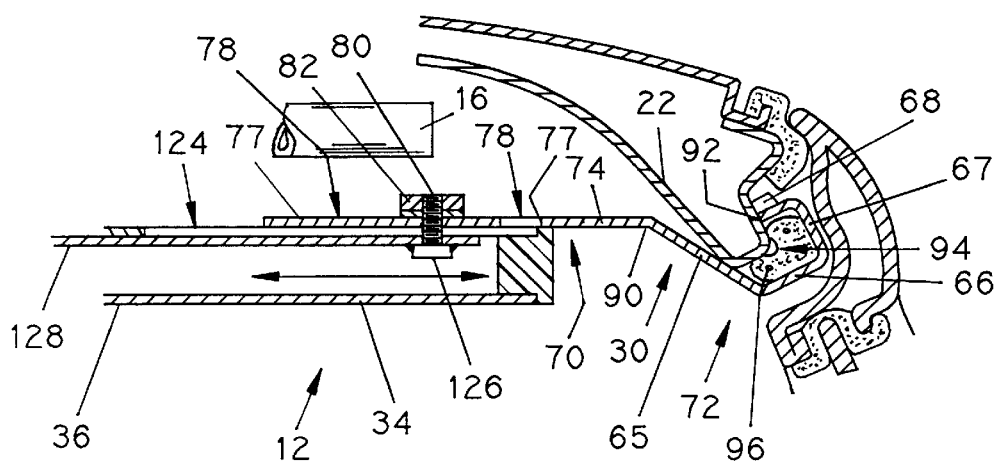
FIG. 4 is a sectional view taken along line 4—4 of FIG. 1 showing one of the clamp members engaging the frame member and attached to the tightener, the clamp member engaging one of the rear door frames of the vehicle and pulling an inner gasket of the door frame inside of a gasket-receiving space defined by a vehicle-engaging portion of the clamp member so that the inner gasket is not cut or otherwise damaged when the clamp is installed onto the vehicle, the clamp member being tightened inwardly to mount the clamp to the vehicle and being released outwardly to release the clamp from the vehicle.

A tightener 128 is received in interior region 118 of frame member 36 as shown in FIGS. 3–5. Tightener 128 includes an elongated bar extending generally horizontally along the length of frame member 36. A downwardly-extending flange 130 is integrally appended to tightener 128 adjacent to first end 32 of frame member 36. Flange 130 is formed to include a threaded opening 132 for receiving a tightening bolt 138 as described hereinafter.

First and second clamp members 28, 30 are carried by frame member 36 as shown in FIGS. 2–5. First clamp member 28 is substantially similar to second clamp member 30 and the description below related to second clamp member 30 is also descriptive of first clamp member 28. Thus, the description below of second clamp member 30 will also apply to first clamp member 28 unless specifically stated otherwise in the description.

Second clamp member 30 includes an attachment portion 70 engaging frame member 36 and a vehicle-engaging portion 72 engaging rims 22 of door frames 24 of vehicle 20 as shown in FIGS. 3 and 4. Vehicle-engaging portion 72 includes a generally horizontal plate 74 laying against frame member 36. Plate 74 includes two spaced-apart longitudinally-extending side edges 75, an outer edge 90 extending therebetween, and an inner edge 91 longitudinally spaced apart from outer edge 90 and extending between first and second side edges 75. Plate 74 is also formed to include a plurality of edges 77 defining longitudinally spaced-apart openings 78 as shown in FIGS. 4 and 5. In preferred embodiments, the plurality of longitudinally spaced-apart openings 78 includes three openings 78. One of openings 78 receives a threaded post 80 extending upwardly from frame member 36 and a nut 82 is threadably received by threaded post 80 to bolt second clamp member 30 to frame member 36 as shown in FIGS. 2–5.

It will be appreciated by those skilled in the art that a distance 84 between rims 22 of door frames 24 of vehicle 20, as shown in FIG. 1, will vary between different models of vehicles 20. Clamp 12 can accommodate varied distances 84 between rims 22 of door frames 24 by adjusting a distance 142, shown in FIG. 2, between first clamp member 28 and second clamp member 30. Distance 142 is adjusted by selecting the appropriate opening 78 of second clamp member 30 to receive threaded post 80. Illustrative clamp 12 is shown in FIG. 4 having second clamp member 30 positioned so that threaded post 80 is received by the middle of openings 78. However, if clamp 12 were to be clamped to a vehicle having a larger distance 84 between the rims of the door frames, then the innermost of openings 78 could be selected to receive threaded post 80 to maximize distance 142, maximizing the distance that vehicle-engaging portion 72 extends outwardly. Likewise, if clamp 12 were to be clamped to a vehicle having rims of door frames that were closer together than distance 84, the outermost of openings 78 could be selected to receive threaded post 80.

First and second spaced-apart flanges 76 are appended to side edges 75 of plate 74 of attachment portion 70 of clamp member 30 and extend downwardly therefrom as shown best in FIGS. 2, 3 and 5. Flanges 76 are spaced apart and are configured to receive frame member 36 therebetween so that flanges 76 are positioned to lie adjacent to opposing sides of frame member 36. Each flange 76 includes an inner edge 86 defining a stop 88 engaging frame member 36. Stops 88 are thus positioned to lie on both sides of frame member 36 and both stops 88 engage frame member 36 and cooperate with edge 77 of opening 78 receiving threaded post 80 to prevent rotation of attachment portion 70 of second clamp member 30 relative to frame member 36 about threaded post 80.

Vehicle-engaging portion 72 of second clamp member 30 is integrally appended to attachment portion 70 at edge 90 so that vehicle-engaging portion 72 is fixed relative to attachment portion 70 as shown in FIGS. 2–5. As described above, edge 90 is longitudinally spaced apart from openings 78 that receive threaded post 80 so that vehicle-engaging portion 72 is longitudinally spaced-apart from openings 78.

Vehicle-engaging portion 72 extends from edge 90 to a tip 92 and is curled so that tip 92 is spaced apart from edge 90 and so that tip 92 opposes edge 90 as shown best in FIGS. 2 and 4. Vehicle-engaging portion 72 also includes first and second spaced-apart sides 100, 102 extending between edge 90 and tip 92. In preferred embodiments, sides 100, 102 are generally parallel so that tip 92 is generally as wide as edge 90.

In preferred embodiments, vehicle-engaging portion 72 includes a downwardly-angled first plate 65 appended to edge 90 and extending downwardly and outwardly therefrom, an upwardly-angled second plate 66 appended to first plate 65 and extending upwardly and outwardly therefrom, an upwardly-angled third plate 67 spaced apart from first plate 65, appended to second plate 66, and extending upwardly and inwardly therefrom, and a downwardly-angled fourth plate 68 appended to third plate 67, spaced apart from second plate 66, and extending inwardly and downwardly therefrom to terminate at tip 92. However, although preferred vehicle-engaging portion 72 includes first, second, third, and fourth angled plates 65, 66, 67, 68, it is within the scope of the invention as presently perceived for vehicle-engaging portion 72 to include as many angled plates as desired or to include a continuous curved plate so long as tips 92 of clamp members 28, 30 can engage opposing rims 22 of door frames 24 of vehicle 20 to mount vehicle gun rack 10 to vehicle 20.

Vehicle-engaging portion 72 curls around to define a gasket-receiving space 94 so that when clamp 12 is mounted to rims 22 of door frame 24, tip 92 of clamp member 30 engages rim 22 and a portion of rim 22 and of an inner gasket 96 mounted on rim 22 are received in gasket-receiving space 94. In preferred embodiments, vehicle-engaging portion 72 and gasket-receiving space 94 are sized so that gasket 96 can be compressed to fit within gasket-receiving space 94 allowing tip 92 to directly engage rim 22 and allowing installation of clamp 12 without damaging or having tip 92 press into inner gasket 96.

Clamp 12 includes threaded post 80 extending upwardly from top 110 of frame member 36 adjacent to second end 34 of frame member 36 and a threaded post 120 extending upwardly from top 110 of frame member 36 adjacent to first end 32 of frame member 36 as shown in FIG. 5. First threaded post 120 extends upwardly through an opening 122 formed in top 110 of frame member 36 and in preferred embodiments first threaded post 120 is welded to top 110. Second threaded post 80 extends upwardly through an opening 126 formed in tightener 128 and through a longitudinally-extending slot 124 formed in top 110 of frame member 36. In preferred embodiments, second threaded post 80 is welded to tightener 128 as shown in FIG. 4.

A stop plate 134 is attached to first end 32 of frame member 36 and is generally parallel to flange 130 of tightener 128 as shown best in FIG. 5. Stop plate 134 is formed to include an opening 136 receiving a tightening bolt 138 having a head 140. Tightening bolt 138 extends longitudinally from outside of stop plate 134 through opening 136 of stop plate 134 to threadably engage threaded opening 132 of flange 130 of tightener 128 in interior region 118 of frame member 36. Head 140 of tightening bolt 138 is sized so that head 140 will not fit through opening 136 of stop plate 134.

As described above, first clamp member 28 is attached to threaded post 120 which is fixed relative to first end 32 of frame member 36 as shown in FIG. 5. Also, second clamp member 30 is attached to second threaded post 80 which is fixed to tightener 128 adjacent to second end 34 of frame member 36. Second threaded post 80 extends through longitudinally-extending slot 124 formed adjacent to second end 34 of frame member 36 so that as tightening bolt 138 rotates and flange 130 and tightener 128 move relative to frame member 36, second threaded post 80 and second clamp member 30 also move relative to frame member 36. Thus, rotating tightening bolt 138 will cause second clamp member 30 to move relative to first clamp member 28 which is fixed to frame member 36.

Installing vehicle gun rack 10 into vehicle 20 requires that first and second clamp members 28, 30 are installed on threaded posts 120, 80 as shown in FIG. 5. Attachment portion 70 of each clamp member 28, 30 is formed to include longitudinally spaced-apart openings 78 and when first and second clamp members 28, 30 are installed on threaded posts 120, 80 appropriate openings 78 on each clamp member 28, 30 are selected so that distance 142 between tips 92 of first and second clamp members 28, 30 is approximately equal to distance 84 between rims 22 of door frames 24 of vehicle 20. Once first and second clamp members 28, 30 are installed on first and second threaded posts 120, 80 and secured thereto by nuts 82, clamp 12 is positioned by the user so that first and second clamp members 28, 30 engage rims 22 of door frames 24.

Once clamp members 28, 30 engage rims 22 of door frames 24, clamp 12 can be positioned relative to the front and rear of vehicle 20 to adjust to the length of the reach of the law enforcement officer as shown in FIG. 1. When clamp 12 is suitably positioned, tightening bolt 138 is rotated to pull second clamp member 30 toward first clamp member 28 so that clamp 12 tightly clamps rims 22 of vehicle 20 to mount vehicle gun rack 10 to vehicle 20. Advantageously, clamp 12 can be easily readjusted after installation to suit the reach of another law enforcement officer having a different reach by simply turning tightening bolt 138 to loosen second clamp member 30 relative to first clamp member 28, repositioning clamp 12 relative to the front and rear of vehicle 20, and rotating tightening bolt 138 to pull second clamp member 30 toward first clamp member 28 so that clamp 12 once again tightly clamps rims 22 of vehicle 20.

It will be appreciated by law enforcement officers and others carrying weapons in vehicles that clamp 12 in accordance with the present invention provides a low cost mechanism for mounting weapon holder 14 or any other suitable holder for weapons adjacent to ceiling 40 of passenger compartment 18 of vehicle 20. In addition, clamp 12 is mounted without drilling holes or using fasteners that penetrate or in any other way diminish the structural integrity of vehicle 20. Also, clamp 12 can carry weapon holder 14 or any suitable holder for weapons and can carry known and readily available gun locks such as gun lock 56.

Although the invention has been described in detail with reference to a preferred embodiment, variations and modifications exist within the scope and spirit of the invention as described and defined in the following claims.

I claim:

1. A clamp for fixing a gun rack to a vehicle having first and second door frames, the clamp comprising
    an elongated frame,
    a first clamp member for gripping a door frame attached to the frame,
    a second clamp member for gripping a door frame spaced apart from the first clamp member and movable relative to the frame, and
    a tightener attached to the frame and to the second clamp member to move the second clamp member relative to the first clamp member to position the clamp members so they grasp the first door frame and the second door frame of the vehicle.

2. The clamp of claim 1, wherein the first and second clamp members are each formed to include an opening and further comprising first and second spaced-apart posts extending upwardly from the frame, the first post being received by the opening of the first clamp member and the second post being received by the opening of the second clamp member.

3. The clamp of claim 2, wherein the first post is fixed to the frame and the second post is fixed to the tightener.

4. The clamp of claim 3, wherein the frame includes an edge defining a longitudinally extending slot and the second post extends upwardly from the tightener through the slot.

5. The clamp of claim 2, wherein the opening of the second clamp member is a first opening and the second clamp member is formed to include a plurality of longitudinally spaced-apart openings one of which is the first opening.

6. The clamp of claim 2, wherein each clamp member includes a plate engaging the frame and first and second spaced-apart upstanding flanges appended to the plate, each flange including a stop, and the first flange cooperates with the second flange to define a frame-receiving space therebetween, the frame being received in the frame-receiving space of each clamp member, and the stops engage the frame to prevent rotation of the clamp members relative to the frame.

7. The clamp of claim 1, wherein the tightener includes a flange formed to include an opening and further comprising a tightening bolt threadably received by the opening of the flange to couple the tightener to the frame so that the flange and the tightener move relative to the frame when the tightening bolt is rotated.

8. The clamp of claim 7, further comprising a stop plate fixed to the frame, the stop plate being formed to include an opening, and the tightening bolt includes a head that is larger than the opening in the stop plate, the tightening bolt extending through the opening in the stop plate to the interior region of the frame and the opening of the flange so that the head of the tightening bolt is positioned to lie outside of the interior region of the frame.

9. A clamp member for mounting a frame to a vehicle adjacent to a ceiling of a passenger compartment of the vehicle, the clamp member comprising
    a plate having first and second spaced-apart and generally longitudinally-extending side edges and with an outer and inner edge extending between the first and second sides edges,
    a vehicle-attachment portion appended to the plate's outer edge and extending in the longitudinally-extending direction of the side edges and away from the outer edge, the vehicle-attachment portion including a tip end spaced in the longitudinal direction from the plate, and
    wherein the vehicle-attachment portion is shaped so that the tip end faces the plate.

10. The clamp member of claim 9, wherein the vehicle-attachment portion is appended to the plate at a transverse edge and the vehicle-attachment portion includes first and second spaced-apart sides extending between the transverse edge and the tip, the sides of the vehicle-attachment portion being generally parallel so that the distance between the first and second sides at the tip is generally the same as the distance between the first and second sides at the transverse edge.

11. The clamp member of claim 9, wherein the vehicle-attachment portion is curled and is shaped to define a space longitudinally spaced-apart from the plate.

12. The clamp member of claim 11, wherein the vehicle attachment portion includes a downwardly-angled first plate appended to the transverse edge and extending downwardly and outwardly therefrom, an upwardly-angled second plate appended to the first plate and extending upwardly and outwardly therefrom, an upwardly-angled third plate spaced apart from the first plate, appended to the second plate, and extending upwardly and inwardly therefrom, and a downwardly-angled fourth plate appended to the third plate, spaced apart from the second plate, and extending inwardly and downwardly therefrom to terminate at the tip.

13. The clamp member of claim 9, wherein the side edges of the plate are spaced apart a first distance adjacent to the transverse edge and a second distance adjacent to the inner edge, the first distance being greater than the second distance.

14. The clamp member of claim 9, wherein the plate is formed to include a plurality of longitudinally spaced-apart openings that are longitudinally spaced apart from the transverse edge and from the inner edge.

15. The clamp member of claim 9, further comprising first and second spaced-apart flanges appended to the plate and extending downwardly therefrom.

16. The clamp member of claim 15, wherein the first flange is appended to the first side edge of the plate and the second flange is appended to the second side edge of the plate.

17. A weapon holder apparatus configured to be mounted between a first door frame and a second door frame of a vehicle, the apparatus comprising:

a frame having a first end and a second end;

a weapon holder coupled to the frame;

a first clamp coupled to the first end of the frame, the first clamp being configured to engage the first door frame; and a second clamp coupled to the second end of the frame, the second clamp being configured to engage the second end of the frame, to suspend the frame and the weapon holder adjacent a ceiling of the vehicle.

18. The apparatus of claim 17, wherein a distance between the first clamp and the second clamp is adjustable.

19. The apparatus of claim 17, wherein the first clamp is rigidly coupled to the first end of the frame, and the second clamp is slidably coupled to the second end of the frame to permit the distance between the first clamp and the second clamp to be adjusted.

20. The apparatus of claim 19, further comprising a tightener coupled to the second clamp to adjust the distance between the first clamp and the second clamp.

* * * * *